Oct. 6, 1931.  J. H. MANSFIELD ET AL  1,825,749
SCREW MACHINE
Filed Aug. 8, 1927   8 Sheets-Sheet 1

Inventors:
Judson H. Mansfield
Chester F. Penrose
By Wilson & McCanna
Attys.

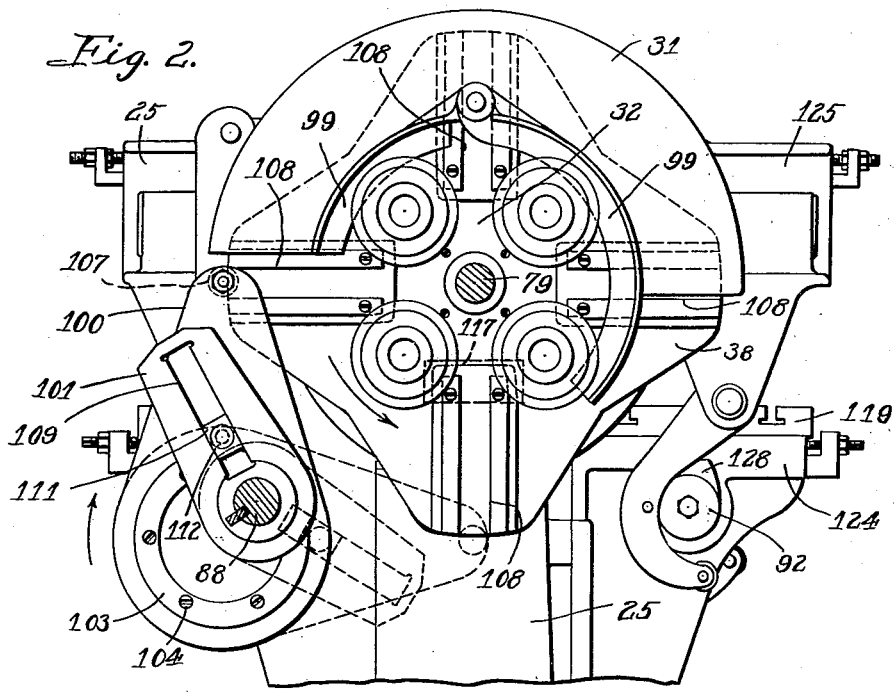
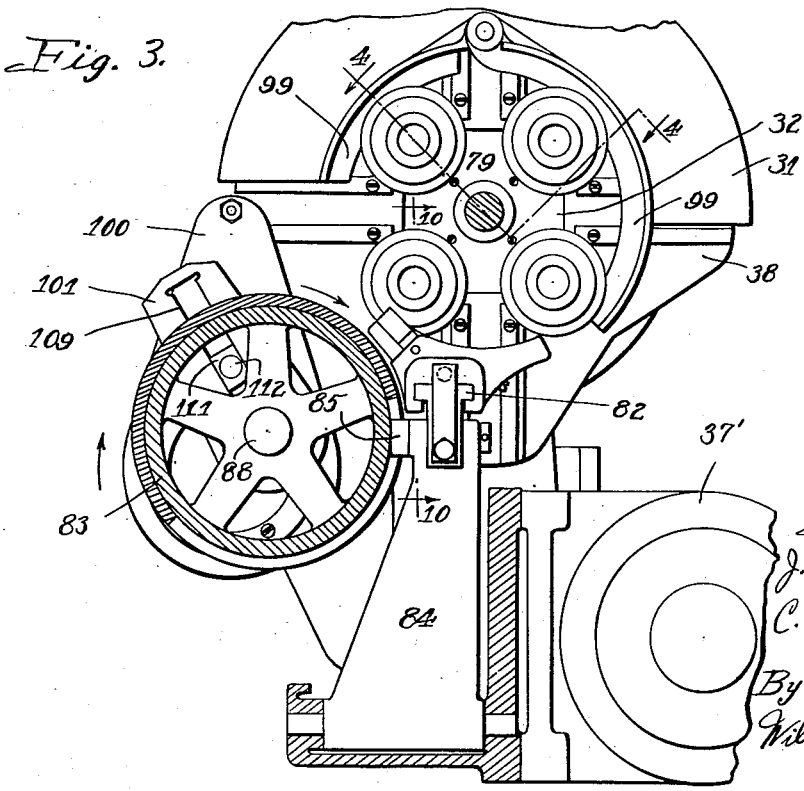

Oct. 6, 1931.   J. H. MANSFIELD ET AL   1,825,749
SCREW MACHINE
Filed Aug. 8, 1927    8 Sheets-Sheet 3
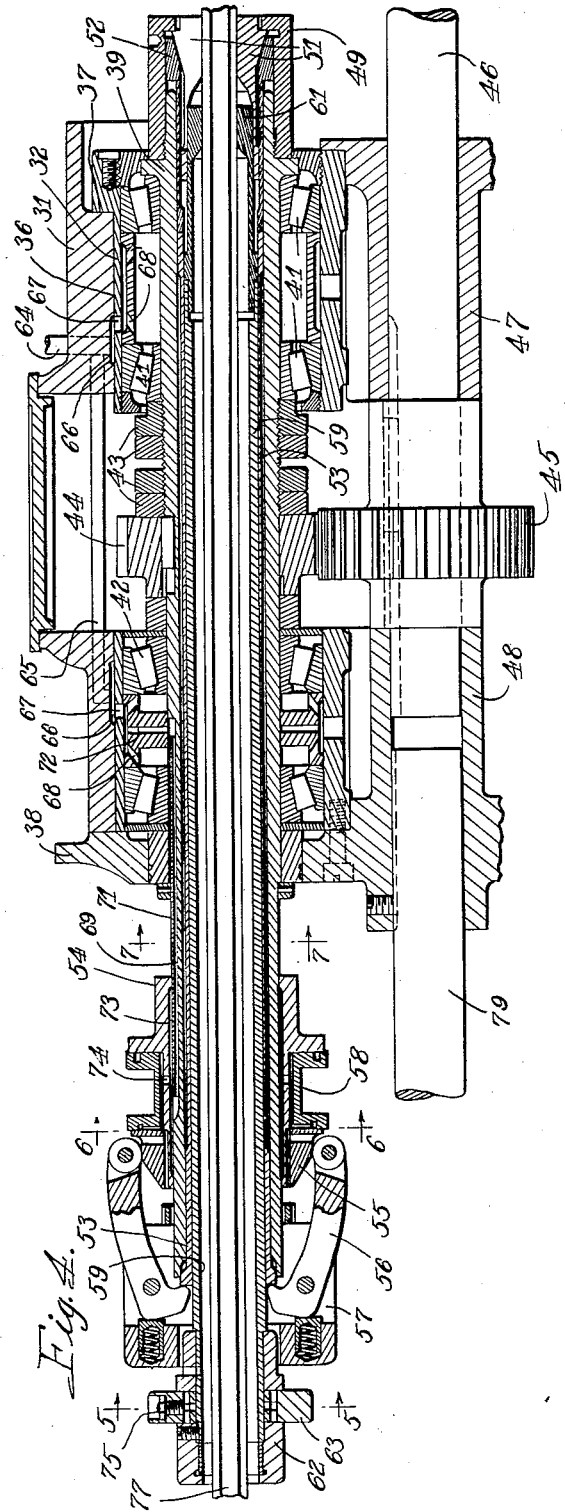
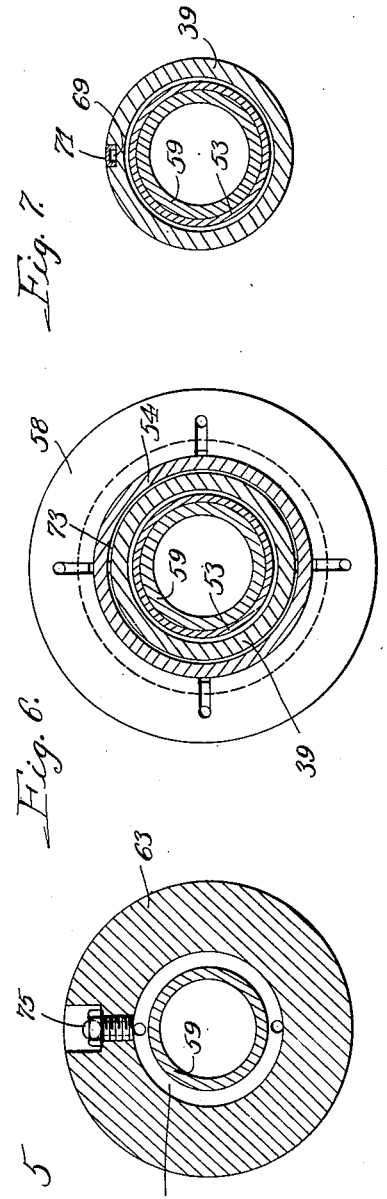
Inventors
Judson H. Mansfield
Chester F. Penrose
By Wilson & McCanna
Attys Oct. 6, 1931.    J. H. MANSFIELD ET AL    1,825,749
SCREW MACHINE
Filed Aug. 8, 1927    8 Sheets-Sheet 4

Inventors.
Judson H. Mansfield
Chester F. Penrose
By
Wilson & McEnna
Attys.

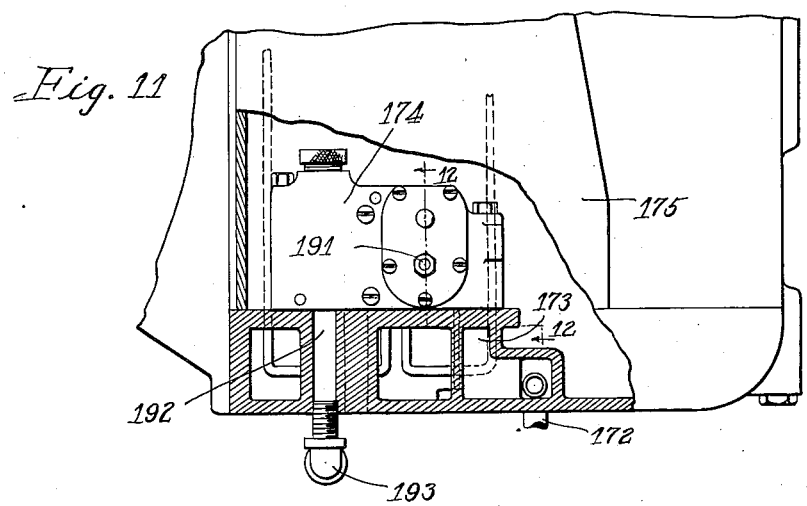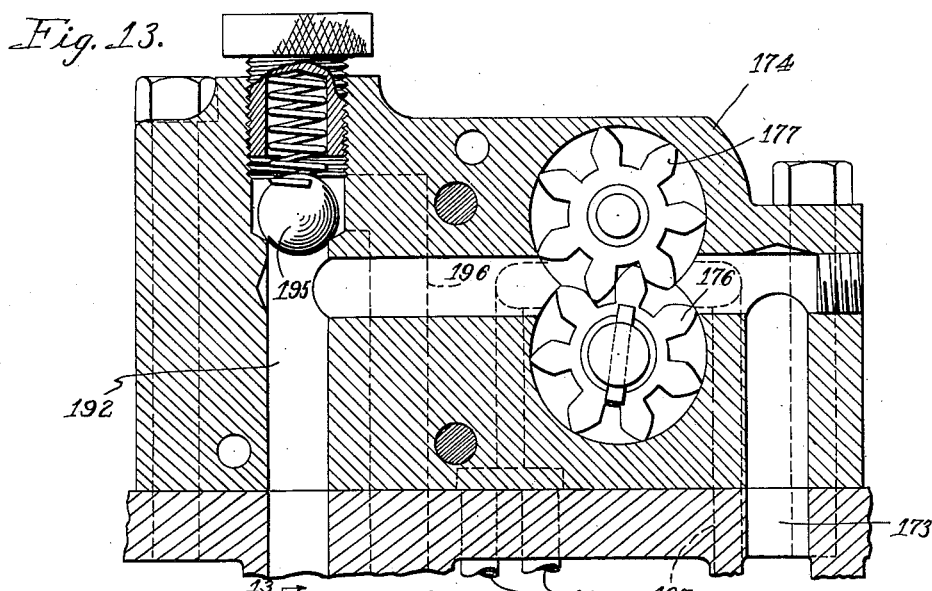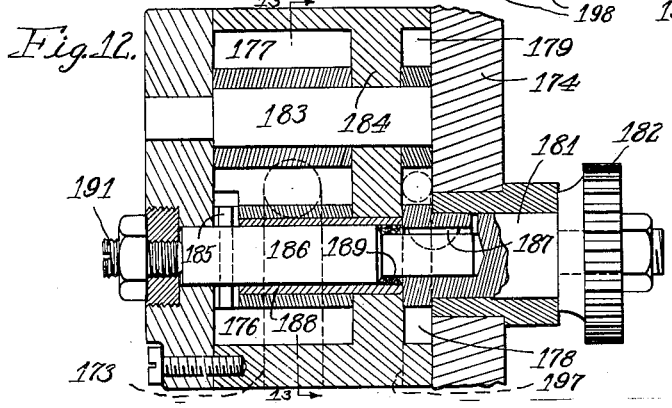

Oct. 6, 1931. J. H. MANSFIELD ET AL 1,825,749
SCREW MACHINE
Filed Aug. 8, 1927  8 Sheets-Sheet 6
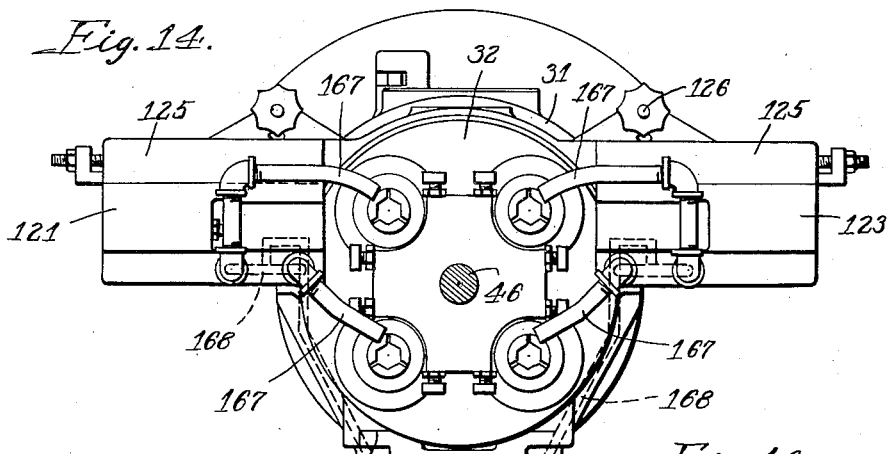
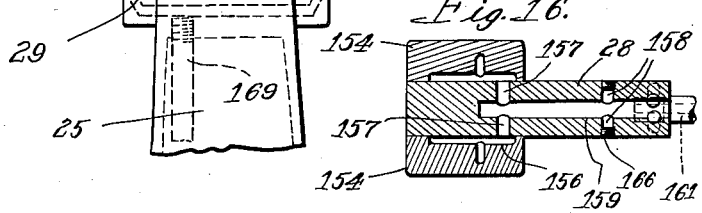
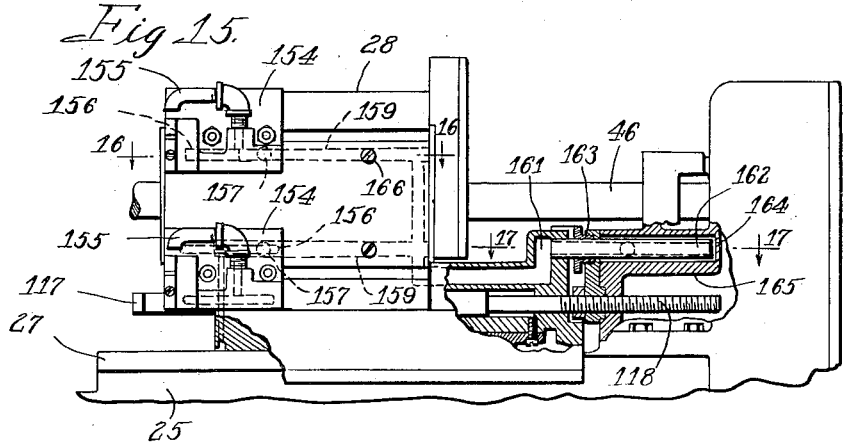
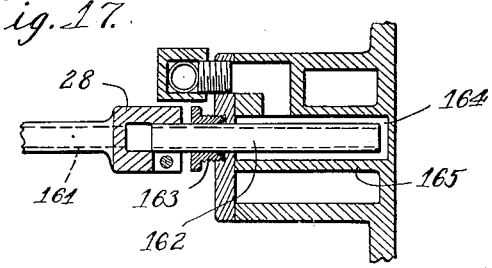
Inventors:
Judson H. Mansfield
Chester F. Penrose
By Wilson & McCanna
Attys

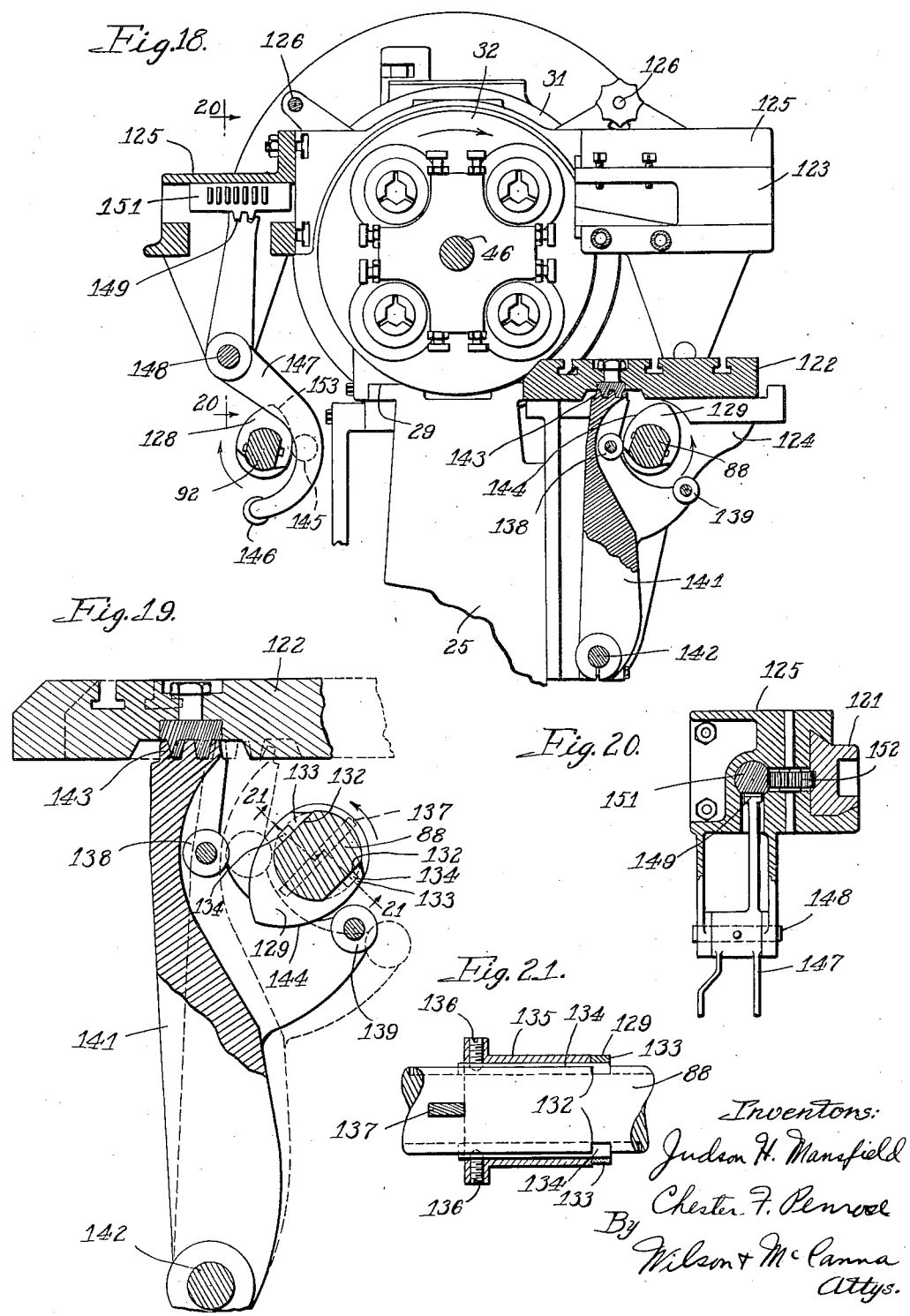

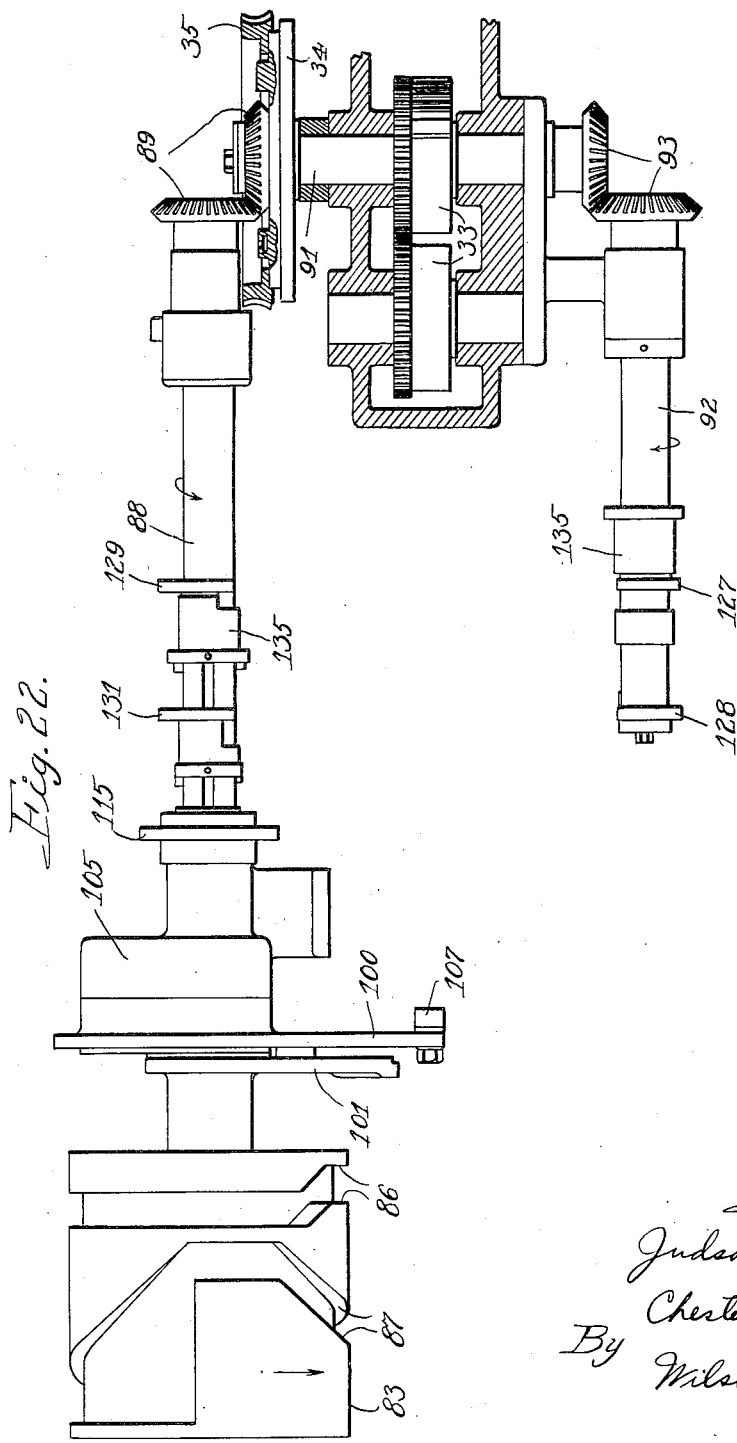

Patented Oct. 6, 1931

1,825,749

UNITED STATES PATENT OFFICE

JUDSON H. MANSFIELD AND CHESTER F. PENROSE, OF ROCKFORD, ILLINOIS, ASSIGNORS TO GREENLEE BROS. & CO., OF ROCKFORD, ILLINOIS, A CORPORATION OF ILLINOIS

SCREW MACHINE

Application filed August 8, 1927. Serial No. 211,387.

This invention relates to metal working machines of the class commonly known as screw machines, in which bars of metal stock of sufficient length to form more than one completed article are carried by a rotatable head or turret to various tools for producing screws, bolts, pins, and other small parts or articles.

Our invention aims primarily to generally improve the construction and operation of automatic screw machines with a view to more simple and direct operation of the various cooperating mechanisms, precision and certainty in the timing and operating of said mechanisms, reducing maintenance cost, and increasing the production capacity.

The matter of increasing the production capacity of a machine of this class presents a problem in view of the various operations comprising the cycle of a machine of this class, especially with regard to the operations which occur during the idle time of the machine, that is, the time required for all operations with the exception of actual cutting of the metal. One of the controlling factors here is the time necessary for operating the stock feed tube and the holding collet for each spindle while the stock-carrying head is being indexed. Any gain which can be made in the amount of time in a complete cycle given to the indexing of the head will increase the available time for feeding stock and operating the stock-holding collet. According to our invention this gain is accomplished by the use of a novel indexing mechanism. This mechanism, one of the chief features of our invention, enables reduction of the idle time of machines of this class and also allows the machine to be speeded up so as to give greater production.

We have also aimed to provide as an indexing mechanism and also as a mechanical movement per se, a novel combination comprising a Geneva motion and a Whitworth motion which, coacting as disclosed herein, produce a new motion.

Other objects are to provide improved cam mechanism for operating the cross-feed slides and the auxiliary slides, characterized by a single cam which engages alternately with rollers for imparting feed and return movements to each slide, also by the use of separate cam constructions of this kind for operating both the lower cross-feed slides and the upper or auxiliary slides whereby they may be independently controlled; to provide an improved cutting oil supply system which eliminates the usual unsightly and troublesome piping and flexible connections on the outside of the machine, permits greater accessibility to the tools for removal and set-up, and insures a better distribution of the cutting oil or compound, making it possible to always deliver at the actual cutting edge of each tool; to improve the collet spool and to provide a system of lubrication therefor and for the spindles and other parts; to provide an improved stock feed ring and a safety device in connection with operating the feed tube; to provide an improved system of pumping and distributing the cutting oil as well as the lubricating oil; and to generally improve the construction and arrangement of parts as will be apparent from the following description and the drawings.

Referring to the drawings,—

Figure 1 is a front elevation of an automatic screw machine embodying our invention;

Figs. 2 and 3 are cross-sectional views taken substantially on the lines 2—2 and 3—3, respectively, of Fig. 1;

Fig. 4 is an enlarged sectional view longitudinally through one of the spindles and a portion of the head structure, as taken substantially on the line 4—4 of Fig. 3;

Figs. 5, 6 and 7 are enlarged cross-sections taken on the lines 5—5, 6—6 and 7—7, respectively, of Fig. 4;

Fig. 11 is a section taken on the line 11—11 of Fig. 1;

Fig. 12 is a section taken on the line 12—12 of Fig. 11;

Fig. 13 is a section taken on the line 13—13 of Fig. 12;

Fig. 14 is a transverse section taken on the line 14—14 of Fig. 1, omitting the lower cross-slides;

Fig. 15 is a fragmentary front elevation of the main tool slide, showing a part of the cutting oil system in section;

Figure 1:
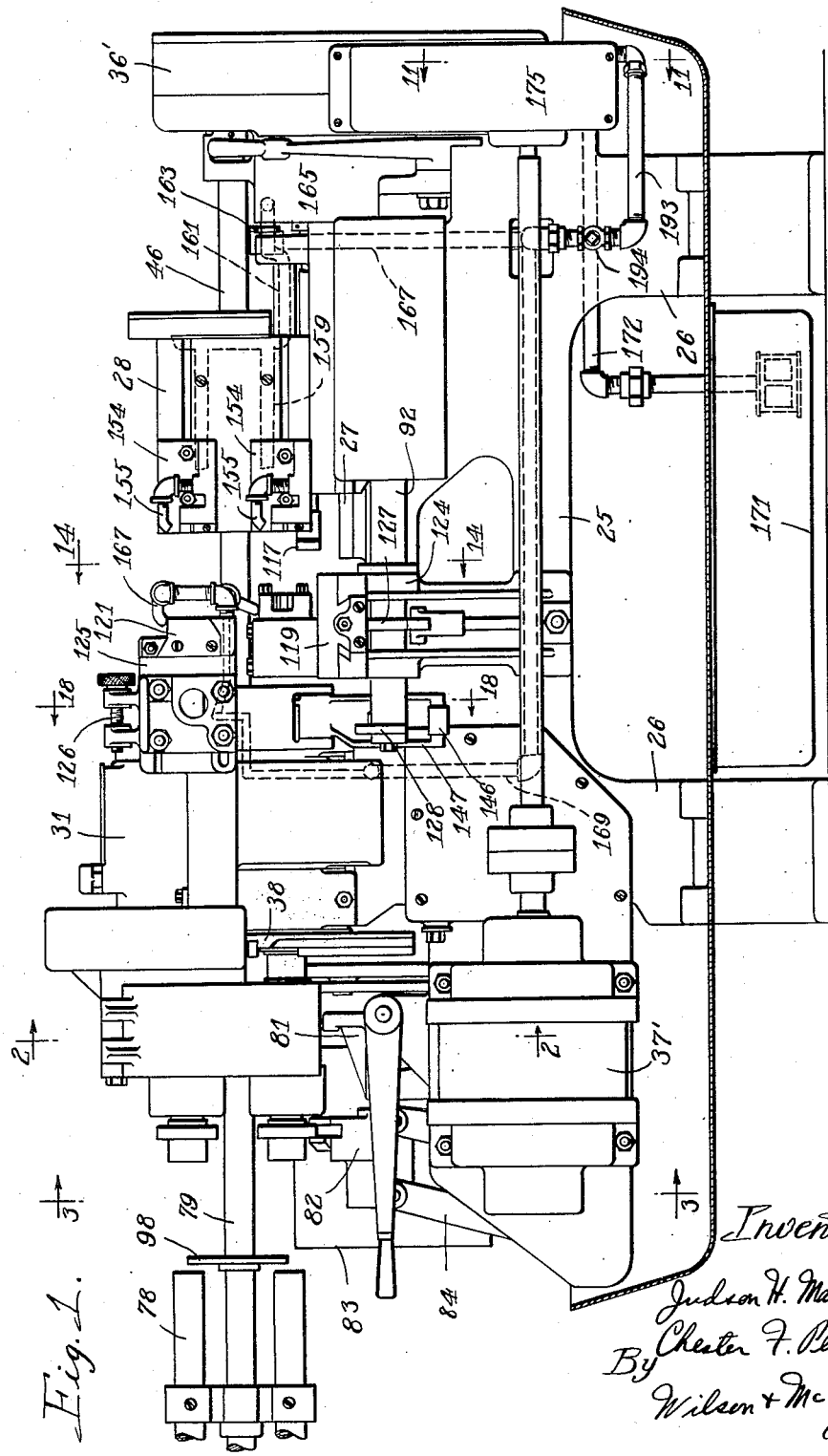

Figs. 16 and 17 are sections taken on the lines 16—16 and 17—17, respectively, of Fig. 15;

Fig. 18 is a transverse section taken on the line 18—18 of Fig. 1, with the lower front cross-slide removed and certain parts in section;

Fig. 19 is an enlarged fragmentary view illustrating the cam operation of the lower back cross-slide;

Fig. 20 is a section on the line 20—20 of Fig. 18;

Fig. 21 is a section on the line 21—21 of Fig. 19; and

Fig. 22 is a fragmentary plan view illustrating the cam shafts and the main slide feed mechanism.

The present invention while applicable to metal working machines in general is here shown as applied to an automatic screw machine of the kind and type shown in U. S. Letters Patent No. 1,591,818 dated July 6, 1926, and is an improvement thereon. In the accompanying drawings we have, therefore, shown only such parts as are necessary for an understanding of the present invention. Before entering into a detailed description of our improvements we will describe briefly the cycle of operations performed by the present machine.

Cycle of operations

The main tool carrying slide remains stationary at its return from the cutting stroke, at which time the indexing lock pin is withdrawn from the stock-carrying head. The head will then be indexed. During the indexing motion the stock-holding collet will be opened and as the lower rear spindle is indexed to the lower forward position the stock-feeding tube will carry the stock ahead against a stationary work stop. Just before the stock-feeding tube has completed its movement the work-holding collet will start to close, being completely closed at the end of the stock-feeding movement. At the completion of the indexing motion the lock pin will engage and hold the work head. The main tool carrying slide and the cross-slides will then feed forward until the tools are just clear of the work, when the slow feed will be engaged and the cutting operations will be performed. After completion of the cutting operations the slides will be returned at a high rate of speed to the starting position, thus completing the cycle. It is common in this art to refer to the movements of the different mechanisms or devices as cycles. For example, in this machine we have the main tool slide cycle, the indexing head cycle, the collet cycle, and the stock feed cycle. The "idle time" of the machine, referred to hereinafter, is the time required for all of the cycles except the actual cutting of metal which occurs during the tool slide cycle.

Frame construction

The frame or bed may be of any suitable or preferred construction and in this instance comprises a bed designated generally by 25 supported on legs 26 and provided with horizontal ways 27 upon which the main tool slide designated generally by 28 is adapted to slide back and forth, and horizontal ways 29 upon which is rigidly mounted a housing 31 for the indexing head designated generally by 32. The mechanisms described later are mounted on the frame structure or in connection therewith, as will be obvious.

Tool slide and feed

The main tool slide 28, above-mentioned, is adapted to carry tools for cutting the stock in the four working positions presented by the four stock-carrying spindles in the indexing head. Inasmuch as the present invention is not concerned with any specific slide feed mechanism none is shown except in part, as in Fig. 22. This shows mutilated gears 33 and a rotary cam 34 such as are used in the patent above-mentioned for imparting the feed and return movements to the main tool slide. In this instance the slide feed parts 33 and 34 are driven by a worm gear 35 in turn driven by a gearing train including change speed gears in a gear box 36' driven by a motor 37' mounted at the front of the machine. The drive train includes a high and low speed clutch device or the equivalent for changing the rate of the drive during each cycle of operation. This drive mechanism is not shown because it forms no part of the present invention and is well understood in the art.

Stock-carrying head

The head or turret 32, above-mentioned, in which the stock spindles are mounted to rotate, is in the form of a drum in turn mounted to rotate in the housing 31. As shown in Fig. 4 the head has a plain bearing 36 in the housing and is held from lengthwise displacement by the shoulder 37 at its front end and by an indexing plate 38 suitably fastened to the rear end of the head. The spindles are constructed alike and a detailed description of one applies to all.

The spindle 39 is suitably mounted for rotation in the head as by means of front and rear sets of radial and thrust bearings 41 and 42 which are held in position by sets of lock nuts 43. The spindle is rotated by means of a spur gear 44 keyed thereto and meshing with a central gear 45 keyed to a spindle drive shaft 46 which is mounted for rotation in a bearing block 47 fixed in the front end of the head and in a bearing hub 48 integral with the index plate 38. The shaft 46 extends forwardly through the tool slide and is continuously driven by the gearing in the gear box 36'.

The spindle is equipped at its front end with a suitable collet chuck designated generally by 49 having collets 51 and collet-closing jaws 52, the latter adapted to be actuated by lengthwise movement of a sleeve 53 within the spindle, as is well known in this art. The collet-operating sleeve in turn is adapted to be operated by a shipper-ball, designated generally by 54, through the intermediary of a cone 55 and levers 56, the latter being pivoted to a collar 57 carried by the spindle. The shipper-ball has a spool 58 mounted so that it is free to rotate upon and with respect to the sleeve of the shipper-ball proper. This is an improvement over the usual practice as will be noted hereinafter.

Within the collet sleeve is mounted to slide lengthwise a stock feed tube 59 connected at its front end with stock gripping jaws 61 adapted to frictionally engage the stock for feeding it forward when the stock is released by the collets. The feet tube is equipped at its rear end with a fixed collar 62 and a freely rotatable ring 63, this also being an improvement the advantage of which will be noted later.

An improved system of lubricating the running parts in the head and those associated with the spindles is also provided. The oil feed, from a source of supply which will be described later, is delivered through the pipes 64 and 65, Fig. 4, to oil grooves 66 in the head bearings 36. The head has a series of oil openings 67 which provide communication between the oil grooves 66 and the roller bearing cases which in turn have ports 68 providing communication with the roller bearings. Provision is made for delivering oil feed from the rear bearing, rearwardly through the spindle to the collet spool 58 and its shipper-ball. To this end the spindle is grooved longitudinally at 69 and a channel shaped filler strip 71 is inserted in the groove so as to provide an oil communication between the passage 72 and an oil groove 73 in the shipper-ball 54. Oil from the latter groove is distributed through passages 74 to oil grooves in the inner and radial faces of the collet spool. The oil from both spindle bearings runs down into the housing and is drained into a suitable well to be recirculated, the oil within the housing serving incidentally to lubricate the spindle gears. By this system of lubrication all of the rotating parts connected within the revolving head and spindles are positively lubricated. The bearing surfaces of the feed tube ring 63 are lubricated through a ball check valve 75 which communicates with an oil chamber 76 within the collar, in turn having communication with the inner and side bearing faces.

The bar stock 77 to be worked is guided beyond the rear of the head in a tube 78, of which there are four comprising a reel. This reel is suitably supported and connected by a shaft 79 to the index plate 38, as shown in Fig. 4, so as to revolve with the head.

Collet and stock tube operators

Figures 9, 10:
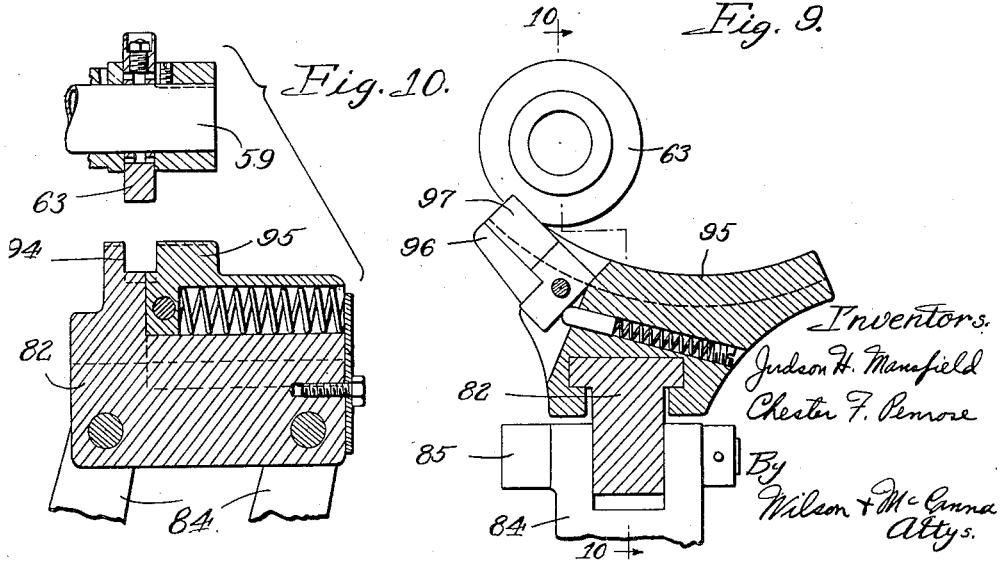
Fig. 9 is a section taken on the line 9—9 of Fig. 8.
Fig. 10 is a section taken on the line 10—10 of Fig. 9.

The collet spool 58 and the feed tube ring 63 are adapted to be operated independently by operator shoes 81 and 82, respectively, by means of cams on a cam drum 83. Each operator shoe is supported on a pair of parallel links 84 the pivotal connections of which are all on horizontal axes with the lower supporting pivots beneath the operator shoes, thus providing substantial and long wearing bearing support therefor. Each operator shoe has a cam roller such as 85, Figs. 3 and 9, adapted to be operated by cam plates on the drum 83. As shown in Fig. 22 the collet cam is indicated by 86 and the stock feed cam, 87.

The cam drum 83 is fixed to a horizontal cam shaft 88 suitably journalled at the back of the machine and connected by 1 to 1 bevel gears 89 to a cross-shaft 91 fixed to the worm gear 35 and likewise to one of the mutilated gears 33. A second cam shaft 92 at the front of the machine is also connected by 1 to 1 bevel gears 93 to the cross-shaft 91. As a result of the foregoing all of the cam-operated devices or mechanisms, as well as the main tool slide, are co-related in an exceptionally simple and direct manner and are positively operated in predetermined timed relation.

The feed tube operator shoe 82 has an arcuate groove 94 for reception of the ring 63 of each spindle when by indexing of the head it is brought around into registration with the groove. This operation is well known in the art. The shoe 82 has a spring-pressed yielding part 95 mounted on a T-slide and provides the rear face of the groove 94 to allow a give in the feed in the event that advance of the feed tube is stopped as sometimes occurs. There are also times when the shoe 82 is forward that the stock feed tube will work backward before the time for engagement in the groove 94, in which event the shoe 82, that is, its part 95, would jamb against the ring 63. To avert this we have equipped the part 95 with a spring-pressed yieldable dog 96 having a bevel surface 97 adapted to ride under the ring 63 during the return movement of the shoe and snap back into position after passing the ring. A stop ring 98 fixed to the shaft 79, Fig. 8, limits rearward movement of the feed tube ring 63.

Figure 8:
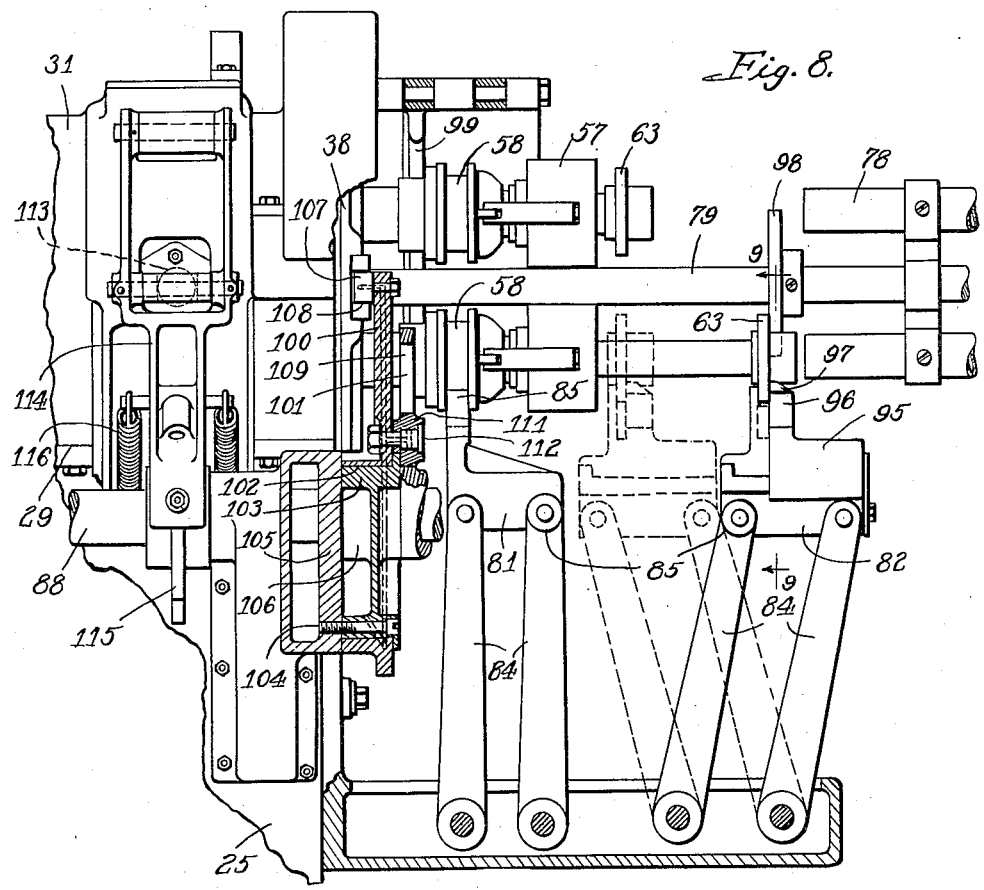
Fig. 8 is a fragmentary rear elevation showing the indexing mechanism in section.

The ring operator shoe 81 has an arcuate part 85 adapted to engage the spool 58 when the head is indexed. In the position of the collet spool shown in Figs. 4 and 8 the collets are held closed. While the collet spool at the fourth working position is held in the closed position by the shoe 81, the collet spools in the first, second, and third working positions are held in their closed positions by engagement behind a stop flange 99 supported from the housing. In Fig. 8 the feed tube shoe is shown in its rearmost position ready for feeding the stock forward, whereas in Fig. 4 the tube is at the end of its feed stroke.

It will be here noted that the collet spools 58 and the tube feed rings 63 are free to revolve on lubricated bearings and that when engaged by their respective operators they will be held by the contact therewith while their supporting parts rotate, thus eliminating wear between the parts which are frequently brought into and out of contact and avoiding the troubles incident to such wear.

*Indexing mechanism*

Our invention contemplates as one of its features the provision of means for reducing the idle time of a machine of this class. As an illustration, the machine shown in the drawings is known in the trade as a 1¼" by 6" multiple spindle automatic screw machine. This means that it will handle bar stock up to 1¼" diameter and will cut to a maximum length of 6 inches. It will be seen, therefore, that in the small interval of time required for indexing, a bar which may be up to 1¼" in diameter and from 12' to 14' in length, weighing approximately 50 pounds, will have to be moved 6 inches and stopped to an exact position, and then locked in such position. The difficulty in this is not so much in feeding it forward rapidly enough, but to be able to feed it forward and retard it to eliminate a rebound which would be bound to occur if it were advanced at a uniform rate of speed and stopped instantly against a fixed stop. From this it will be obvious that any gain made in the amount of time in a complete cycle given to the indexing of the head will increase the available time for feeding stock and closing the stock-holding collets. In this particular machine the main tool slide travels a maximum 6¼ inches and a part of this is at a slow rate of speed during the actual cutting operation. According to our invention we have increased the proportionate time allowed for indexing from 90° to 142°, and in addition to this have made a great difference in the maximum and minimum rates of speed of rotation during the indexing from one position to the other. The actual net gain in speed of the idle cycle in a machine of the above-noted size has been from 10 revolutions per minute or one cycle in 6 seconds, to 22 revolutions per minute or one cycle in 2¾ seconds. These figures are, of course, merely for purpose of illustration and are in no way a limitation.

In furtherance of the foregoing we have devised a new motion for indexing the spindle head, comprising a Geneva stop motion and a Whitworth quick return motion. This combination is, so far as we are aware, novel both as a mechanical movement and as a mechanism for indexing purposes.

As shown in Figs. 2 and 8, this mechanism in its present embodiment comprises an index arm 100 which with the index plate 38 on the spindle head forms the Geneva stop motion. A crank arm 101 fixed to the cam shaft 88 and having a traveling crank pin connection with the index arm for rotating it at a variable speed, forms with the index arm the Whitworth motion. The index arm and the crank arm are mounted in eccentric relation as shown clearly in Fig. 2. In this case the index arm 100 is mounted on an annular bearing 102 circumscribing and eccentric to the cam shaft 88, said bearing being part of a cylindrical member 103 fixed by bolts 104 to a bracket 105 in turn fixed to the main frame. The part 103 also provides a bearing 106 for the cam shaft 88. The index arm 100 carries at its outer end a roller 107 adapted to enter any one of the radial slot-ways 108 in quarteringly spaced relation on the index plate 38. The crank arm 101 has a radial slot-way 109 in which is disposed a block 111 connected by a crank pin 112 to the index arm.

The spindle head is held locked in the position shown in Fig. 2 by a lock pin 113, Fig. 8, as is customary in this art, said lock pin being connected to a lever 114 which is operated by a cam 115 on the cam shaft 88 for withdrawing the pin and by springs 116 for inserting it. The lock pin is withdrawn to permit indexing and is inserted at the finish of each such operation to hold the head in fixed position during each working or cutting period.

As soon as the lock pin is withdrawn the indexing operation is started. The roller 107 enters the slot 108 at a reduced rate of speed of the index arm 100, traveling in a clockwise direction viewing Fig. 2. The index arm moves at an increasing speed until it passes a center line between the centers of the shaft 79 and the shaft 88, and slackens in speed until the spindle head is brought to a stop at the end of the movement. The index arm 100 moves 90° while the crank arm 101 on the cam shaft moves 142°. This enables a greater number of degrees for operation of the stock feed and collet cams with respect to the duration of the indexing operation. The crank arm 101 imparts a relatively quick return movement to the index arm during the balance of the cycle although the speed of the shaft 88 is reduced during this period for the cutting operation. The foregoing motion not only smoothes out the indexing motion but it also permits a decrease in the time required for indexing the work spindles from one position to another.

During the indexing operation the stock bar in the lower rear spindle will be advanced into contact with the work stop 117, Figs. 1, 2, and 15, which is adjustably fixed to the main frame, as for example, by a screw connection 118. This operation of feeding the stock which may involve the maximum weight of bars and length of feed is a limiting factor as above mentioned.

*Cross-slides*

Our invention provides a single rotary cam for operating a feed and a return roller connected with a cross-slide for imparting both the feed and return movements, also the application of a separate cam for each upper and lower tool slide. By means of our improvements the slides may be operated and controlled independently; and the time, duration and distance of each cross-slide operation enables a greater range of cutter movements.

In this case we employ lower front and back cross-slides as well as upper front and back cross-slides, the latter being generally known as auxiliary slides. The lower and upper front slides, designated generally by 119 and 121, respectively, are shown in Fig. 1, and the lower and upper back slides 122 and 123, respectively, in Fig. 18. These slides are suitably mounted on the frame structure or on brackets fixed thereto, the lower slides on horizontal flat bearings and the upper slides on vertical bearings. In this instance the lower slides are mounted on brackets 124 and the upper slides on brackets 125, the latter brackets each being adjustable in a plane parallel with the axis of the stock by means of a screw 126. These slides carry cutting tools as is well understood in this art.

The cross-slide cams are fixed to the cam shafts 88 and 92 in the arrangement shown in Fig. 22, the cams 127 and 128 being for the lower and upper front slides, respectively, and the cams 129 and 131 for the lower and upper back slides, respectively. Each cam is so mounted on its cam shaft as to permit removal at will for change or substitution of cams without disturbing the cam shaft. With the exception of the cam 128 which is on the end of the shaft 92, each cam is constructed and mounted as shown in Figs. 19 and 21. It will be here seen that the shaft 88 is slotted on diametrically opposite sides at 132 to provide parallel seats, and that the cam 129 which has a substantially heart-shaped profile is bifurcated to provide arms 133 adapted to enter the slots 132 and seat against the parallel faces thereof. In order to prevent radial displacement of the cam, keys 134 are mounted in key slots at opposite sides of the cam shaft and engage in registering slots in the cam arms 133. A sleeve 135 embracing keys and having key seats is provided with set screws 136 adapted for locking the keys thereto, the sleeve in turn being clamped in position by a tapered key 137 extending diametrically through the cam shaft and serving to press the sleeve endwise against the cam. The cam may be removed by withdrawing the key 137, withdrawing the sleeve 135 with the keys 134, and then withdrawing the cam radially from one side of its cam shaft.

Each cam is utilized for operating a feed roller 138 and a return roller 139 connected with its slide, these rollers being arranged in such angular location with respect to the center of the cam shaft as to allow the use of a single cam for obtaining the desired cycle of movements. As shown in Figs. 18 and 19, the cam rollers 138 and 139 are mounted on a lever 141 pivoted on the frame at 142 and having a segmental gear connection 143 with the slide 122. In this case the feed roller 138 is in the horizontal plane of the cam shaft and the return roller is located substantially below said plane so that the centers of these parts are in angular relation. The cam face 144 of the cam 129 acts against the roller 138 when the cam rotates in a counter-clockwise direction, viewing Fig. 18, to advance and feed the slide, and subsequently in its cycle acts against the roller 139 to return the slide to the starting position.

The upper slides are operated in substantially the same manner, except that a different leverage arrangement is employed. As shown in Figs. 18 and 20 the cam 128 is adapted to operate the feed and return rollers 145 and 146, respectively, carried in angular relation by a lever 147 pivoted at 148 on the bracket 125. The upstanding arm of the lever 147 has a segmental gear connection 149 with a rack bar 151 slidable in the bracket 125 and in mesh with a pinion 152 which in turn meshes with a rack on the cross-slide 121. The cam shaft 92 rotates in a clockwise direction viewing Fig. 18 and the cam surface 153 on the cam 128 will, by successive engagement with the rollers 145 and 146, move the slide 121 in feed and return movements, respectively. The same arrangement applies to the cam 131 for operating the upper back slide 123.

The foregoing provides an exceptionally simple and direct means for operating both the lower and upper cross-slides, each wholly independent of the other. This is an improvement over the prior practice in which the upper or auxiliary slides were operated by or in conjunction with the lower slides so that the cutting operations of the upper tools were dependent on the characteristics of the operations of the lower tools. Another advantage is that each slide is positively operated in its feed and return movements by a single cam and that these cams are so constructed and mounted as to allow quick and easy removal and replacement.

Cutting oil system

Our invention contemplates the provision of a nozzle on each tool holder or slide for delivering cutting oil or compound to the work and supplied by a system having a source remote from the tool slides and including passages through either the slides or the tool holders, or both, as the case may be. This provides interior distribution of the cutting oil and eliminates the unsightly and awkward exposed piping and flexible connections usually found on screw machines. These exposed connections are, of course, a considerable hindrance when setting up the tools as well as when inspecting the work and making adjustments.

Referring to Figs. 15, 16 and 17, each tool holder 154 on the main slide 28 is equipped with a delivery nozzle 155 arranged to deliver cutting oil in the desired close proximity to its cutting tool. Each tool holder has on its inner side an elongated oil passage 156 communicating with its nozzle and adapted to communicate at any adjusted position with a port 157 in the slide. These ports 157 as well as additional ports 158 lead into main passages 159 in the slide and said main passages in turn communicate through a passage 161 with a pipe extension 162 which passes through a stuffing box 163 and enters an oil chamber 164 in a stationary housing 165. In this particular set-up of the tools the ports 158 not being in use are closed by plugs 166. Assuming that cutting oil is delivered under pressure to the chamber 164 it will be carried through the passages just described to the nozzles 155 and delivered to the tools throughout the cutting operation.

Cutting oil is delivered to the cross-slide tools through nozzles 167 which in this instance are mounted on the slide holder brackets 125. Said nozzles are supplied with oil through passages 168 formed within said brackets and the housing or frame structure. Said passages lead down to a pipe 169 which in turn connects with a source of supply. It should be understood that in practice the cutting oil nozzles may be mounted in any suitable manner according to the form and location of the tool holders and the nature of the work, and likewise the interior cutting oil passages may be suitably arranged within the slides or supporting structure.

Along with our improved system of distributing cutting oil we have provided a novel form of double pump for circulating both the cutting oil and the lubricating oil. The cutting oil drains into a sump 171 and is drawn through pipe 172 to the inlet 173, Fig. 13, of a rotary gear pump mounted in a casing 174 within the housing 175. This pump has a pair of gears 176 and 177 for the cutting oil and gears 178 and 179 for the lubricating oil. These gears, disposed in separate chambers, as noted in Fig. 12, are so mounted as to be driven from a common member. This mounting also prevents leakage or passage of the oils from one chamber to another. The gear 178 in this instance is integral with a drive shaft 181 to which is fixed a drive gear 182 adapted to be driven by any suitable means. The driven gear 179 of this pair revolves loosely about a shaft 183 which has a press fit in the wall 184 separating the pump chambers. The gear 176 is connected by a pin 185 to a shaft 186 which in turn is connected by a key 187 to the shaft 181. A sleeve 188 having a press fit at one end in the wall 184 provides a supporting bearing for both the shaft 186 and the gear 176 as well as serving with the shaft 186 to provide a stuffing box for the packing 189. By means of a screw 191 the packing may be compressed to maintain a fluid tight joint around the gear driving shaft between the two oil chambers. The gear 177 rotates loosely on the shaft 183. The cutting oil is discharged by the gear pump through the outlet 192 and in this instance is carried by piping 193 to the piping 167 and 169 which lead to the nozzles. Valves may be placed at suitable points in the system to control the feed of cutting oil to the nozzles, in this instance only a single valve 194 being shown in the line 193. A relief valve 195, Fig. 13, permits the cutting oil to bypass through passage 196 back to the inlet or source of supply when occasion arises. The pump for the lubricating oil has an inlet 197 connected with a suitable source of supply, and the outlet for this pump has suitable pipes or leads 198 delivering to different points such, for example, as the pipe 64 for lubricating the spindles and parts associated therewith.

We claim:

1. In a screw machine, the combination of a multiple spindle head adapted to be indexed, an upper and a lower cross-slide at the front of the machine, an upper and a lower cross-slide at the back of the machine, a cam shaft at the front and another at the back of the machine connected by a cross-shaft and gearing so as to be operated in timed relation, and separate cams on each cam shaft connected respectively with the upper and lower slides at the adjacent side of the machine for imparting feed and return movements thereto.

2. In a screw machine, the combination of a multiple spindle head adapted to be indexed, upper and lower horizontal cross-slides at the front and at the rear of the head, and a separate cam for operating each slide to impart feed and return movement thereto, each cam being independently removable and replaceable whereby the motion characteristics of each slide may be controlled independently of the other.

3. In a screw machine, the combination of a multiple spindle head, lower cross-slides at the front and back of the machine, upper auxiliary cross-slides at the front and back of the machine, a horizontal cam shaft at the front and at the rear of the machine, cams on said shafts for operating the lower slides, and separate cams on said shafts for operating the auxiliary slides independently of the lower slides.

4. In a screw machine, the combination of a multiple spindle head adapted to be indexed, an upper and a lower horizontal cross-slide, a horizontal cam shaft below the lower slide, a cam on said shaft for each of the slides, a lever for operating the lower slide equipped with a feed roller and a return roller adapted to be actuated by the lower slide cam for imparting feed and return movements to the lower slide, and a lever equipped with a feed roller and a return roller adapted to be actuated by the upper slide cam for imparting feed and return movements to the upper slide.

5. In a metal working machine, the combination of a part adapted to be moved back and forth in feed and return movements, a cam shaft the periphery of which has parallel slots on diametrically opposite sides, a cam adapted to be positioned on the shaft in said slots, keys on the shaft for holding the cam from withdrawal, and a feed and a return roller at opposite sides of the cam connected with the said part and adapted to be operated by the cam for imparting said feed and return movements.

6. In a multiple spindle screw machine, the combination of the tool slides, a nozzle on each tool slide for delivering cutting oil to a tool carried thereby, a source of cutting oil supply remote from the tool slides, and means for conducting the cutting oil from said source of supply to said nozzles including oil passages through the respective tool slides.

7. In a screw machine, the combination of a multiple spindle head, a tool slide, a tool holder on the tool slide, a source of cutting oil supply on the machine remote from the tool slide, a nozzle mounted on the tool holder for delivering cutting oil to a tool carried thereby, and means for conducting the cutting oil from said source of supply to said nozzle including an oil passage through the tool slide proper.

8. In a multiple spindle screw machine, the combination of a tool slide, a tool holder adapted to be mounted thereon, a nozzle on the tool holder adapted for delivering cutting oil to a tool carried by the holder, a cutting oil supply passage within the slide having a delivery port, and a passage in the tool holder communicating with the nozzle and adapted to register with said port.

9. In a multiple spindle screw machine, the combination of a frame, a tool slide mounted thereon and having a nozzle adapted for delivering cutting oil to a tool carried thereby, a cutting oil chamber adjacent to the tool slide and connected with a source of cutting oil supply, and oil passages carried by the tool slide connecting said chamber with the discharge nozzle.

10. In a multiple spindle screw machine, the combination set forth in claim 9, in which said passages include a pipe fixed to the tool slide and adapted to telescope within said chamber so as to provide constant communication therewith when the slide is moved back and forth.

11. In a multiple spindle screw machine, the combination of a stock feed tube for each spindle, a ring mounted with capacity to rotate freely on each tube, and a shoe adapted to engage each stock feed ring in succession for imparting feed and return movements to the stock feed tube.

12. In a multiple spindle screw machine, the combination of a stock feed tube for each spindle, a ring mounted with capacity to rotate freely on each tube, and a shoe adapted to engage each stock feed ring in succession for imparting feed and return movements to the stock feed tube, said shoe having an arcuate groove in which the stock feed ring is adapted to engage and having also a displaceable dog constituting a part of the groove wall and serving as a safety device.

13. In a screw machine, in combination, an index head having spindles each equipped with a stock feed tube and collet-operating means including a shipper-ball, a collet spool mounted to rotate freely on each shipper-ball, a ring mounted to rotate freely on each feed tube, and operators adapted to engage the said collet spool and ring of each spindle and to retain said spool and ring from rotation when in operative engagement therewith.

14. In a screw machine, in combination, an index head having spindles each equipped with a collet chuck and a collet-operating sleeve, said sleeve being located within the spindle, a shipper-ball slidable on the spindle beyond the head for operating said sleeve, and an oil passage in the spindle for delivering lubricant from the head to the shipper-ball.

15. In a screw machine, the combination set forth in claim 14, in which the shipper-ball has a spool freely rotatable thereon and oil communication is provided between said oil passage and the spool bearing.

16. In a multiple spindle screw machine, the combination of an index head in which the work spindles rotate, a housing for said head, means providing for lubrication of parts within the housing, the tools, nozzles for delivering cutting oil to the tools, and a double pump having a common drive, one pump serving to deliver cutting oil to said nozzles and the other lubricating oil to said housing.

17. A multiple spindle screw machine comprising a multiple spindle head adapted to be indexed, indexing mechanism, a main tool slide movable lengthwise of said head, stock feed mechanism, a main cam shaft extending along the back of the machine having cam means for operating the stock feed mechanism and indexing mechanism, a cross-slide at the front of the machine, a cam shaft at the front of the machine for operating said cross-slide, a cross-shaft having a gearing connection at each end with the front and rear cam shafts, and a driving connection between said cross-shaft and the main tool slide.

18. An automatic multiple screw machine, comprising a multiple spindle head adapted to be indexed, a tool slide movable lengthwise of the head, a horizontal cross-slide at the front and another at the rear of the machine, a horizontal cam shaft at the front of the machine and another at the rear thereof, a cross-shaft connecting said cam shafts in timed relation and having an operating connection with the main tool slide, mechanism operated by the rear cam shaft for indexing the head, and cams on the front and rear cam shafts for advancing and retracting the cross-slides.

19. An automatic multiple spindle screw machine as set forth in claim 18, in which the cross-slide cams are independently removable from the respective cam shafts and replaceable by other cams for changing the motion characteristics of each cross-slide without disturbing the cam shafts.

20. An automatic multiple spindle screw machine comprising a multiple spindle head adapted to be indexed, indexing mechanism, a main tool slide, a cam shaft at the rear of the machine for operating the indexing mechanism, a cross-slide tool holder at the front of the machine, a cam shaft at the front of the machine beneath the cross-slide ways, a cross-shaft connecting the front and rear cam shafts and having an operating connection with the main tool slide, a lever fulcrumed beneath the front cam shaft and connected at its upper end to the cross-slide, an advancing and a retracting roller in spaced relation on said lever, and a cam on the front cam shaft arranged to operate between said rollers for advancing and retracting the cross-slide.

21. In a metal working machine of the character described, the combination of one or more tool slides, a nozzle on each slide for delivering cutting fluid to a tool carried thereby, a source of cutting fluid supply remote from said slides, and means for conducting the cutting fluid from the said source of supply to said nozzles including oil passages through portions of the tool slides proper.

22. A machine as set forth in claim 21, wherein one of the tool slide members is reciprocable relative to an adjacent stationary housing member, the latter having a chamber therein supplied with the cutting fluid, and a tube fixed on one of said members and telescoping in an opening provided in the other member and serving to provide constant communication between the chamber in said housing and the passage in said slide.

23. In a metal working machine of the character described, the combination of one or more slides, a nozzle on each slide for delivering a fluid, such as cutting oil, a source of fluid supply remote from the slides and means for conducting the fluid from the source of supply to said nozzles through concealed fluid passages and without exposed piping.

24. In a machine of the character described, the combination of a head having one or more spindles each equipped with a collet chuck and a collet operating sleeve, said sleeve being located within the spindle, a shipper ball slidable on the spindle beyond the head for operating said sleeve, said spindle having a longitudinal groove on the outside thereof extending from the head to the shipper ball to serve as an oil passage, and a closure fitting in said groove leaving the same in communication with the head at one end and the shipper ball at the other end.

25. The combination of a rotary shaft or spindle having an oil groove extending longitudinally of the periphery thereof, the one end of said groove communicating with a part to be lubricated, and the other end opening to a source of oil supply, and a closure strip fitting in said groove and closing the same except at the ends thereof whereby to permit the flow of oil from the source of supply to the part to be lubricated during the turning of said shaft or spindle.

26. The combination of a rotary shaft or spindle having an oil groove extending longitudinally of the periphery thereof, the one end of said groove communicating with a source of oil supply, and the other end of said groove communicating with a part to be lubricated, and a strip channel-shaped in cross-section fitting in said groove with the flanges thereof extending inwardly, said strip serving as an oil conduit whereby oil is arranged to be supplied from the source of supply at one end of said groove to the part to be lubricated at the other end of said groove.

27. In a metal working machine of the character described, the combination of a head having one or more spindles mounted therein, means providing for the lubrication of said spindles and other parts, nozzles for delivering cutting fluid at the work, and a double pump having a common drive, one pump serving to deliver cutting fluid to said nozzles and the other lubricating oil to the lubricating means.

JUDSON H. MANSFIELD.
CHESTER F. PENROSE.